United States Patent [19]
Lee et al.

[11] Patent Number: 5,937,433
[45] Date of Patent: Aug. 10, 1999

[54] METHOD OF CONTROLLING HARD DISK CACHE TO REDUCE POWER CONSUMPTION OF HARD DISK DRIVE USED IN BATTERY POWERED COMPUTER

[75] Inventors: Kil-Moo Lee; Heon-Gil Kim; In-Chul Shin, all of Suwon-shi, Rep. of Korea

[73] Assignee: SamSung Electronics Co., Ltd., Suwon, Rep. of Korea

[21] Appl. No.: 08/842,398

[22] Filed: Apr. 24, 1997

[30] Foreign Application Priority Data

Apr. 24, 1996 [KR] Rep. of Korea ............. 96/12742

[51] Int. Cl.⁶ ............................................. G06F 11/34
[52] U.S. Cl. .................... 711/158; 711/158; 711/163; 711/151; 711/118; 711/135; 395/737; 395/733; 395/652
[58] Field of Search ............................. 711/113, 118, 711/133, 135, 151, 158, 163; 395/182.03, 182.08, 182.21, 182.22, 652, 733, 651, 885, 737, 738, 739, 741

[56] References Cited

U.S. PATENT DOCUMENTS

| | | |
|---|---|---|
| 4,835,678 | 5/1989 | Kojuji . |
| 5,257,370 | 10/1993 | Letwin . |
| 5,347,642 | 9/1994 | Baratt . |
| 5,371,872 | 12/1994 | Larsen et al. . |
| 5,475,859 | 12/1995 | Kamabayashi et al. . |
| 5,509,133 | 4/1996 | Nishimukai et al. . |
| 5,535,358 | 7/1996 | Kimura et al. . |
| 5,551,006 | 8/1996 | Kulkarni ............................ 395/473 |
| 5,559,957 | 9/1996 | Balk ............................ 395/182.21 |
| 5,600,816 | 2/1997 | Oldfield et al. . |
| 5,630,142 | 5/1997 | Crump et al. ............................ 395/750 |
| 5,696,897 | 12/1997 | Dong ............................ 395/182.13 |
| 5,748,971 | 5/1998 | Choi et al. ............................ 395/750.03 |
| 5,768,557 | 6/1998 | Kulkarni ............................ 395/473 |
| 5,822,600 | 10/1998 | Hallowell et al. ............................ 395/750.08 |

*Primary Examiner*—John W. Cabeca
*Assistant Examiner*—Pierre-Michel Bataille
*Attorney, Agent, or Firm*—Robert E. Bushnell, Esq.

[57] ABSTRACT

A method of controlling a hard disk cache in a computer having a hard disk drive which is controlled by a write back mode disk cache that reduces the amount of hard disk access includes: initializing a disk cache control program loaded during the software booting by an operating system; determining whether insertion of a new cell in the disk cache is available if an interrupt is invoked responsive to a write request; writing data contained within all cache cells stored in the disk cache into the hard disk drive and inserting the new cell of the write request data into the disk cache if a new cache cell is not available. With this, restricting access to the hard disk drive is possible, which result in reducing power consumption of a hard disk drive motor. Further, losing of data in the cache is prevented when a sudden system power failure or reset occurs.

5 Claims, 9 Drawing Sheets

METHOD OF CONTROLLING HARD DISK CACHE TO REDUCE POWER CONSUMPTION OF HARD DISK DRIVE USED IN BATTERY POWERED COMPUTER

CLAIM OF PRIORITY

This application makes reference to, incorporates the same herein, and claims all benefits accruing under 35 U.S.C. §119 from an application for METHOD OF CONTROLLING HARD DISK CACHE earlier filed in the Korean Industrial Property Office on the 24$^{th}$ day of April 1996 and there duly assigned Ser. No. 12742/1996, a copy of which application is annexed hereto.

FIELD OF THE INVENTION

The present invention relates to method of controlling a hard disk cache, and more particularly to a method of controlling a hard disk cache for reducing power consumption of the hard disk drive used in battery powered computers.

BACKGROUND OF THE INVENTION

Portable computers, such as notebook computers, have became popular for their compactness and mobility. Efforts to enhance their system performance have been continuing. However, they have a fatal shortcoming of limited available usage time due to the limited charge capacity of their internal batteries. Thus, a need arises in that the available usage time of a portable computer on one battery charge must be prolonged as much as possible.

However, it is recognized that increasing the charge capacity of the battery used in the portable computer has limitations due to its restricted size. Thus, reducing the electrical power consumption of components of the computer is desirable as is reducing the power consumed by in the computer itself.

It has been proposed, for example, that the operating voltage of semiconductor devices be reduced from 5 Volts to about 3 Volts or less, and that an Advanced Power Management (APM) system be set up in order to reduce the power consumption of a portable computer system during its use.

As is well known, the APM system has the following features:

First, it lowers the system clock frequency when the computer is not in use for a predetermined time after the computer system has been accessed. Secondly, it automatically shuts off the power supplied to displays, such as an LCD (liquid crystal display), when no keyboard or mouse input, or no changes of an image on the display have occurred for a preset time period. Lastly, it suspends the motor drive operation of a hard disk drive if the hard disk drive has not been accessed for a preset time period.

This power saving scheme is based on shutting off the power directed supplied to the energy consuming components of the computer system, if the computer is not in an interactive state for a predetermined time period.

Meanwhile, in the battery powered computer system, such as a notebook computer using an LCD display panel, it has been found that most of the power consumption occurs in the hard disk drive. In order to reduce the power consumption of the hard disk drive, the computer system which adopts the above APM system controls the driving of a spindle motor or servo motor provided in the hard disk drive by using commands that control the hard disk drive.

When the power saving operation for the hard disk drive is performed in the notebook computer, frequent ON/OFF operations of the driving motor occur due to the cache operation provided between the hard disk drive and the main memory of the computer system.

A disk cache is invisibly added to the system. A disk cache performs read buffering and write buffering between the hard disk drive and the main memory.

In caching write operations, many disk cache adopt write through algorithms to maintain so-called cache coherency and to prevent the loss data held in the cache due to the accidental or intentional power loss. The write through caching operates such that every time a change of data occurs in the cache, it manages to operate the hard disk drive to write the changes in the hard disk.

Therefore, even if the hard disk drive entered into the power saving mode by the APM system that allows the drive motor to stop, when the data in the cache has changed, the motor must be driven again to perform the write operation for the changed data.

At the start of driving a spindle motor of the hard disk drive, a transient period occurs in which the current supplied to the motor varies, until it reaches its normal rotating speed. During the transient period, the supplying current $I_t$ is larger than the normal supplying current $I_s$. Thus, when the motor is driven to start rotating, it requires relatively large amounts of current $I_t$.

Consequently, frequent power on operations from its off state of the drive motor will cause excessive battery consumption, and under some circumstance it will lead to the worst case where a power saving cannot be realized at all.

The following patents each disclose features in common with the present invention but do not teach or suggest the specifically recited method of controlling a hard disk cache for reducing power consumption of the hard disk drive used in battery powered computers in accordance with the present invention.

U.S. Pat. No. 5,475,859 to Kamabayashi et al., entitled Disk Cache Unit Haivn Reduced Waiting Times For Data Transfer, U.S. Pat. No. 5,600,816 to Oldfield et al, entitled, System And Method For Managing Data In A Cache System For A Disk Array, U.S. Pat. No. 4,835,678 to Kofuji, entitled Cache Memory Circuit For Processing A Read Request During Transfer Of A Data Block, U.S. Pat. No. 5,371,872 to Larsen et al., entitled Methods And Apparatus For Controlling Operation Of A Cache Memory During An Interrupt, U.S. Pat. No. 5,509,133 to Nishimukai et al., entitled Data Processing System With An Enhanced Cache Memory Control, U.S. Pat. No. 5,347,642 to Barratt, entitled Cache Memory Management Unit, U.S. Pat. No. 5,257,370 to Letwin, entitled Method And System For Optimizing Data Caching In A Disk-Based Computer System, and U.S. Pat. No. 5,535,358 to Kimura et al., entitled Cache Memory Control Circuit And Method For Controlling Rerading And Writing Requests.

SUMMARY OF THE INVENTION

The present invention is intended to overcome the above described problem of the earlier power saving systems for the hard disk drive.

It is therefore an object of the present invention to provide new method of controlling a hard disk drive in a battery powered computer that can effectively reduce power consumption of the hard disk drive.

It is another object of the present invention to provide a method of controlling the hard disk that can safely write the data held in a cache into the hard disk when a system power failure or reboot is occurring.

According to the present invention, there is provided a method of controlling a hard disk cache which comprises the steps of: initializing a disk cache control program loaded during the software booting by an operating system; receiving an interrupt occurring in the course of execution of a program and determining the kind of the received interrupt, the kinds of interrupt including an an interrupt occurring during a read or write request for the hard disk drive, an SMI (system management interrupt) interrupt occurring during a system power failure or during rebooting, and an interrupt occurring at the end of a program; determining whether requested data exists in the disk cache if the invoked interrupt is the read request interrupt; writing data contained within all cache cells stored in the disk cache into the hard disk drive and reading out the requested data from the hard disk drive, in the absence of the requested data existing in the disk cache; determining whether insertion of a new cell in the disk cache is available, if the invoked interrupt is the write request interrupt; writing data contained within all cache cells stored in the disk cache into the hard disk drive and inserting a new cell of the write request data into the disk cache in the absence of a new cache cell being available; and flushing the disk cache if a cache cell written in the disk cache exists and writing data contained within it into the hard disk drive, if the invoked interrupt is the SMI interrupt or the program ending interrupt.

Preferably, said step of controlling a disk cache responsive to the write request including the steps of determining whether inserting a new cell into the disk cache is available; determining whether a cache cell written in the disk cache exists in the absence of a new cache cell being available; writing data contained within all cache cells stored in the cache into the hard disk drive to be flushed if the written cache cell exists; inserting the requested write data as new cache cell into the disk cache if insertion of a new cell is available or the written cache cell does not exist, and the disk cache has been flushed; and regulating the disk cache control information area of the main memory.

According to the present invention, the hard disk drive is controlled by using a write back mode disk cache that reduces the number of times that the hard disk is accessed, thereby reducing the power consumption of the hard disk is possible. Furthermore, when the computer system is powered off or reset, and the ending of a program is occurring, the disk cache is operated to write the data held in a cache into the hard disk.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
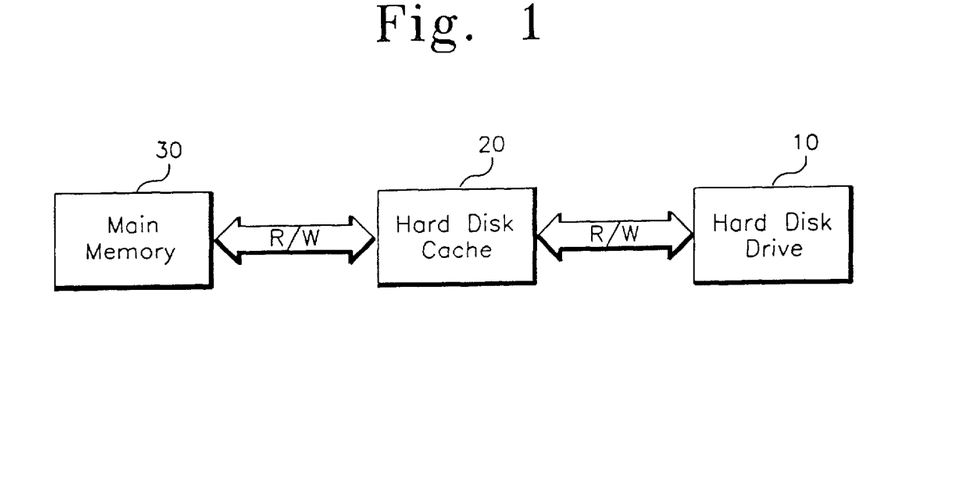
FIG. 1 is a diagram for explaining a the operation of hard disk cache.

FIG. 1 illustrates a disk cache invisibly added to a computer system. A disk cache 20 performs read buffering and write buffering between the hard disk drive and the main memory 30.

Figure 2:
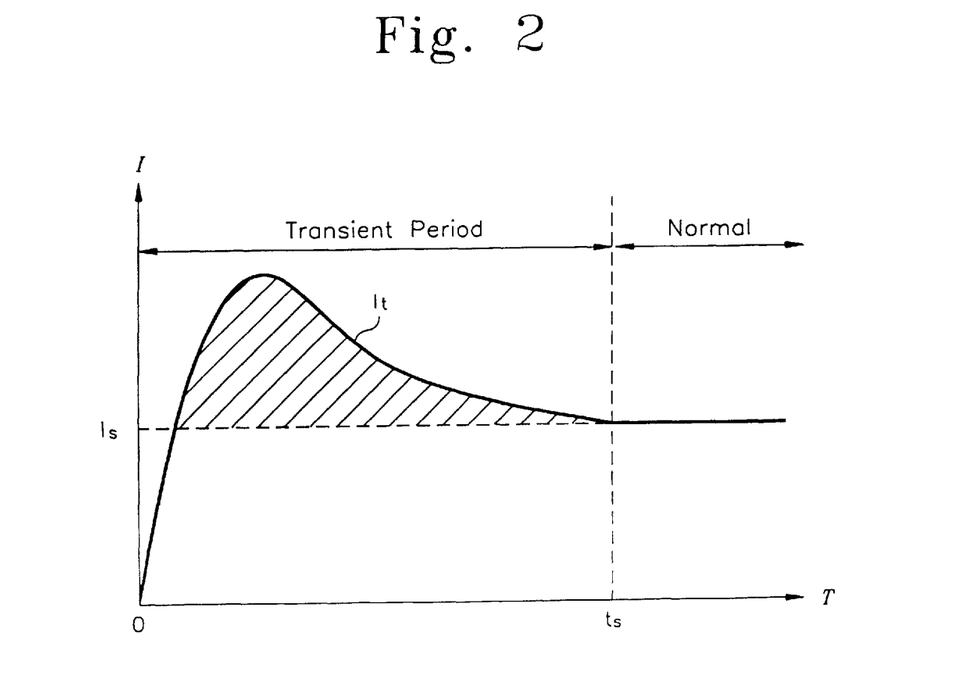
FIG. 2 is a graph showing variation of the current supplied to the spindle motor of a disk drive at the start of the motor driving.

FIG. 2 illustrates the spindle drive motor current with respect to time. It is noted that there is a transient period in which the current supplied to the motor varies until it reaches its normal rotating speed at which time the current is constant.

Figure 3:
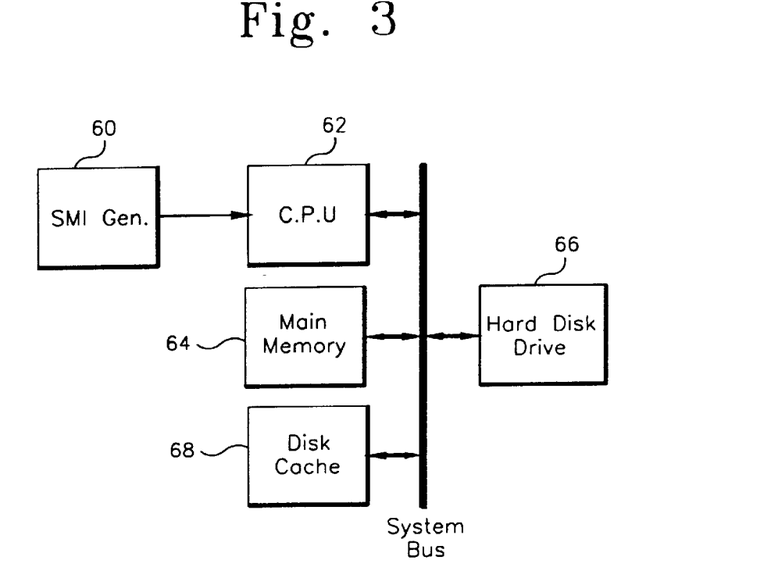
FIG. 3 is a block diagram of a computer system having a system management interrupt (SMI) generator.

FIG. 3 illustrates a computer system in which the method of the present invention is implemented. The computer system comprises a central processing unit (CPU) 62, a main memory 64, a hard disk drive 66, a disk cache 68, and an SMI (System Management Interrupt) generator 60. The CPU 62 is connected to the main memory 64, the hard disk drive 66, and the disk cache 68 via a system bus to effect read/write buffering of the hard disk 66. The CPU 50 is also connected to the SMI generator 60 to receive an SMI signal as will be described later with reference to FIG. 4.

The CPU 62 controls the write buffering operation of the disk cache 68 by using a write back technique according to the present invention. Generally, a write back technique allows the disk cache to operate such that once data in the main memory has changed, the data is held in the cache and the data changes may not be written in the hard disk Meanwhile, in seeking operation if requested data cannot be found in the cache, that is, a miss hit occurs, then the data changes held in the cache are written in the hard disk while the hard disk is accessed to seek the data.

The SMI generator 60 generates an SMI signal when, for example, the system power failure or reboot is occurring. Usually, the SMI is given the highest priority among all of interrupts in the computer system and is assigned to managing the computer system. The CPU 62 has the SMI signal input port connected with the SMI generator 60. Upon receiving the SMI signal, the CPU 62 responds to issue an acknowledge signal (SMI_ACK). Then, it enters an SMI routine.

As previously mentioned, the CPU 62 controls the hard disk drive 66 by using the write back mode as a disk cache control algorithm in order to effectively reduce power consumption in the hard disk drive, and using the above SMI signal to ensure safe write buffering operation. An exemplary configuration which enables the above power saving scheme is disclosed in U.S. patent application Ser. No. 08/816,711, filed Mar. 13, 1997, entitled "Power Saving Apparatus for a Hard Disk Drive and a Method of Controlling the Same" and assigned to the same assignee as that of the present application. A part of the description is incorporated herein and shown in FIG. 4 for reference.

Figure 4:
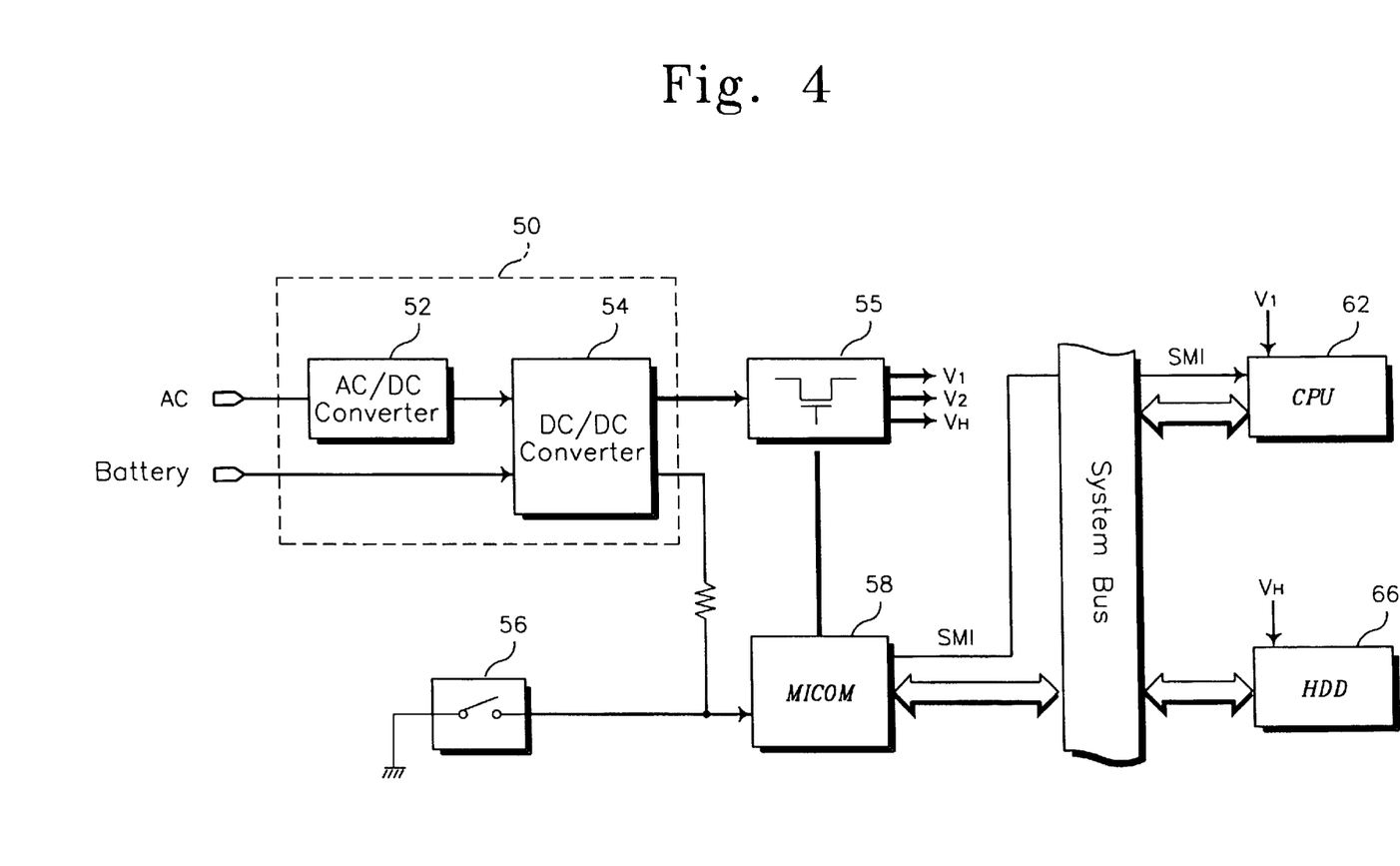
FIG. 4 is a block diagram illustrating an embodiment of the power saving apparatus for hard disk drive operated in response to a SMI signal.

Referring to FIG. 4, the power saving apparatus comprises a power supply unit 50 having an AC/DC converter 52 and a DC/DC converter 54, a first power switch 56, a second power switch 55, a power supply controller 58, and a central processing unit (CPU) 62. The power supply unit 50 supplies necessary voltages for the computer system and generates a voltage level signal corresponding to the present voltage level of the battery. The first power switch 56 produces a power on or off signal in response to manual on or off operations of the switch. The second power switch 55 switches the output voltages of the power supply unit 50 on or off in response to a switching control signal. Furthermore, the power supply controller 58, consisting of a one chip microcomputer, is connected to the CPU 62 via a system bus, and generates battery level data by converting the battery voltage level signal inputted from the power supply unit 50, and generates a power off SMI signal upon receiving power off signal inputted by the first switch 56.

Also, the central processing unit (CPU) 62 generates a request signal for receiving the battery level data from the power supply controller 58 when a battery level check SMI has occurred, and enables the disk cache to operate in the write back mode if the battery level is available for a predetermined time, and controls the power supply control 58 to generate a switch off control signal after the writing of all of the data stored in the disk cache into the hard disk has been completed in response to the power off SMI signal from the power supply controller.

In this arrangement, the power system controller 58 reads out the power off SMI signal from an SMI memory, and sends it to the CPU 62. Additionally, when the battery is separated or ejected from the computer system, and the power supply unit 50 is not supplied with the battery power, the power controller 58 produces a battery eject SMI signal. Responsive to the battery eject SMI signal, the CPU 62 enables the hard disk cache to write all of the data stored in the disk cache into the hard disk drive; then, a power off operation is performed. With this, the losing of data stored in the cache when a system power off occurs is effectively prevented.

Figure 5:
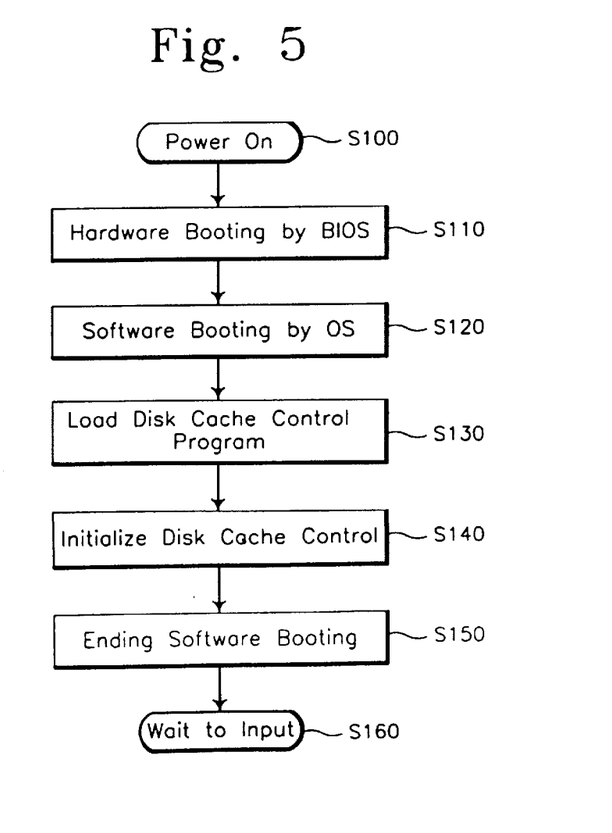
FIG. 5 is a flowchart illustrating the initialization operation of the computer for carrying out the method of the present invention.

FIG. 5 shows an initialization operation of the computer system prior to proceeding with the disk caching operations according to the present invention. The initialization procedure is performed when the power switch is turned on (at step 100) and the initialization program is preferably stored in a boot ROM.

At step 110, normal hardware booting is performed by a system BIOS to initialize the components of the computer. This hardware booting includes a Power On Self Test.

Next, at step 120, normal software booting by an operating system such as MS-DOS is performed. Before booting by MS-DOS, the bootstrap routine stored in a ROM BIOS is executed at the last stage of the above hardware booting. This routine enables data in a boot sector of the hard disk or floppy disk to be copied into the main memory. The contents of the data in the boot sector include information of files necessary for software booting and another bootstrap program. This another program fetches some particular files, such as IO.SYS and MSDOS.SYS, and loads those files into the main memory. Software booting is continued by the system file IO.SYS.

At this moment, control programs for the disk cache are loaded into the main memory 64 in step 130. Subsequently, at step 140, an initializing process for the disk cache is performed. More specifically, this initializing process enables the disk cache control program to be executed if an interrupt is invoked and initialize the control information area of the disk cache having control information for each cache cell of the disk cache 68. The above interrupt includes a BIOS interrupt (13$h$) occurring at read/write operation of the hard disk drive 66, an SMI interrupt occurring at the system power failure or reboot, and a DOS interrupt (4$ch$) occurring at terminating of a program.

After completing initialization of the disk cache control and the required booting process, the software booting by the OS ends at step 150 and the system proceeds to wait to input state at step 160.

Figure 6:
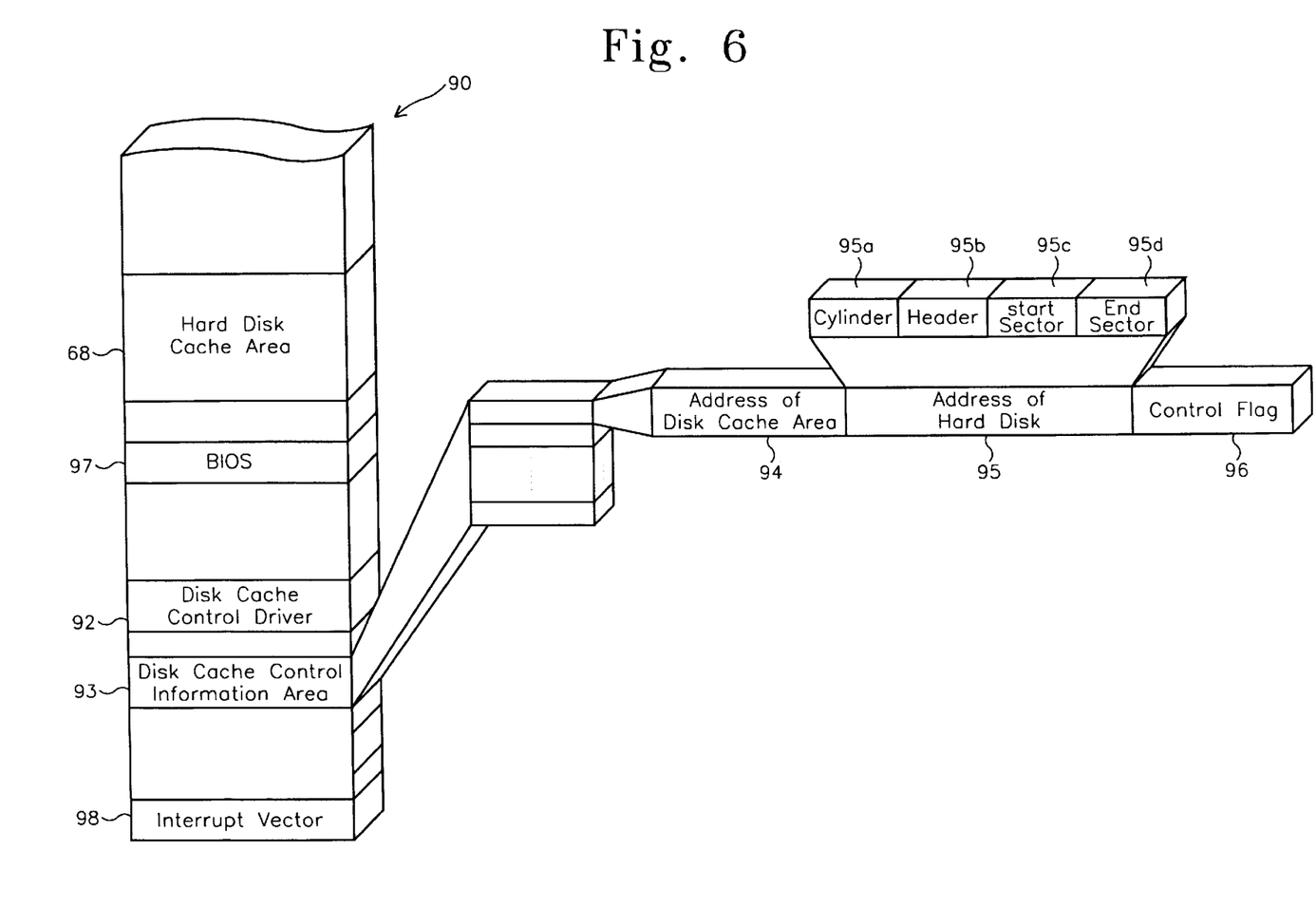
FIG. 6 is a diagrammatic view representing a memory map of the main memory after completing the initialization operation of FIG. 4.

Referring to FIG. 6, there is shown a memory map of the main memory after completing the initialization operation of FIG. 4. As shown in FIG. 6, at predetermined portions of the main memory 90, the interrupt vector table 98 and BIOS 97 including the interrupt routine are located. Also, a hard disk cache area 68, a disk cache control driver 92, and a disk cache control information area 93 are allocated.

The control information area 93 of the disk cache may be comprised of the address of the hard disk cache area 94, address of the hard disk drive 95, and control flags 96 for controlling the disk cache 68. The contents of a cache cell are located in an extended memory and information for the cache cell is located in a conventional memory. The flags 96 represent status of the respective cache cells in the hard disk cache area 68, that is—whether a cache cell has requested write or has duplicated addresses of the hard disk. Also, the addresses of the hard disk drive 95 consist of an indication of cylinder 95$a$, header 95$b$, start sector 95$c$ and end sector 95$d$.

Upon completing the above-mentioned initialization operation for controlling the disk cache, the CPU 62 of the computer system can control the disk cache 68 during execution of a general execution program.

Figure 7:
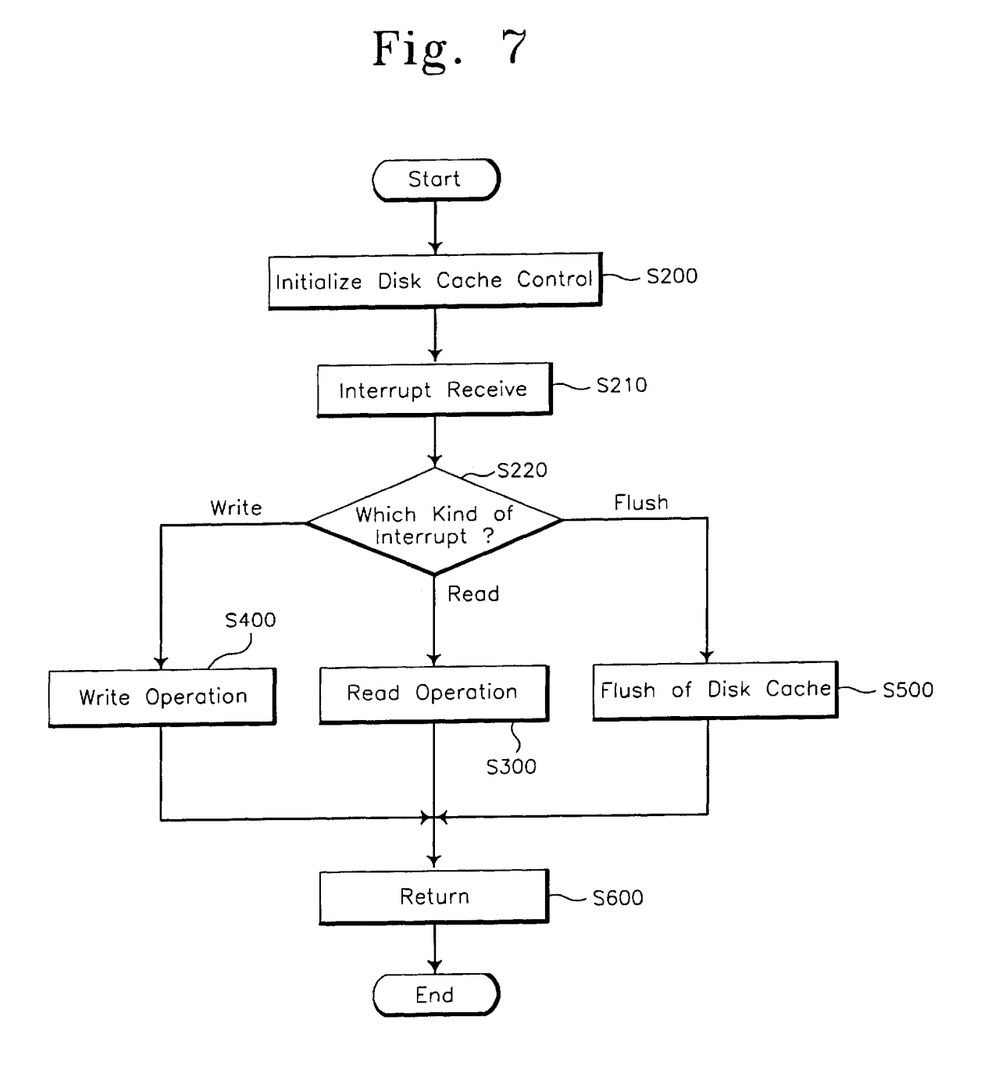
FIG. 7 is a flowchart illustrating a method of controlling hard disk cache according to the present invention.

The controlling method for the disk cache 68 will be described in detail with reference to FIG. 7 to 11. FIG. 7 illustrates an overall control program according to the present invention.

In FIG. 7, first at step 200, when the computer is driven for booting, the disk cache control driver 92 of FIG. 6 is loaded into the main memory 90. Then, the initialization process for controlling a hard disk cache as described with reference to step 140 of FIG. 5 is performed. This initialization proceeds only during the software booting by the OS.

In the next step 210, the system receives an interrupt if one of the aforementioned interrupts is occurring in the course of execution of a program. Then, at step 220, the system determines what kind of interrupt was received and proceeds to the corresponding control steps.

If it is found that the invoked interrupt is the read request interrupt, it proceeds to step 300 to determine whether the requested data exists in the disk cache 68, and if so, to perform a read out operation from the cache. Otherwise, if the requested data does not exist in the cache 68, all cache cells that have been written in the cache 68 are written into the hard disk drive 66. Then, the requested data is read out from the hard disk drive 66 and inserted in to the cache 68.

If the invoked interrupt is the write request interrupt, it proceeds to step 400 to perform a flushing of the disk cache 68 that enables all cache cells that have been written in the cache 68 to be written into the hard disk drive 66. Then, the writing data is inserted into the cache as a new cache cell.

If the interrupt is the SMI interrupt or program ending interrupt, it proceeds to step 500 to perform a flushing operation of the write cache if a cache cell written in the cache 68 exists. The cache cell data is written into the hard disk drive 66.

Upon completing the controlling operation depended on the kind of the interrupt, it proceeds to step 600 to effect an interrupt return.

Figure 8:
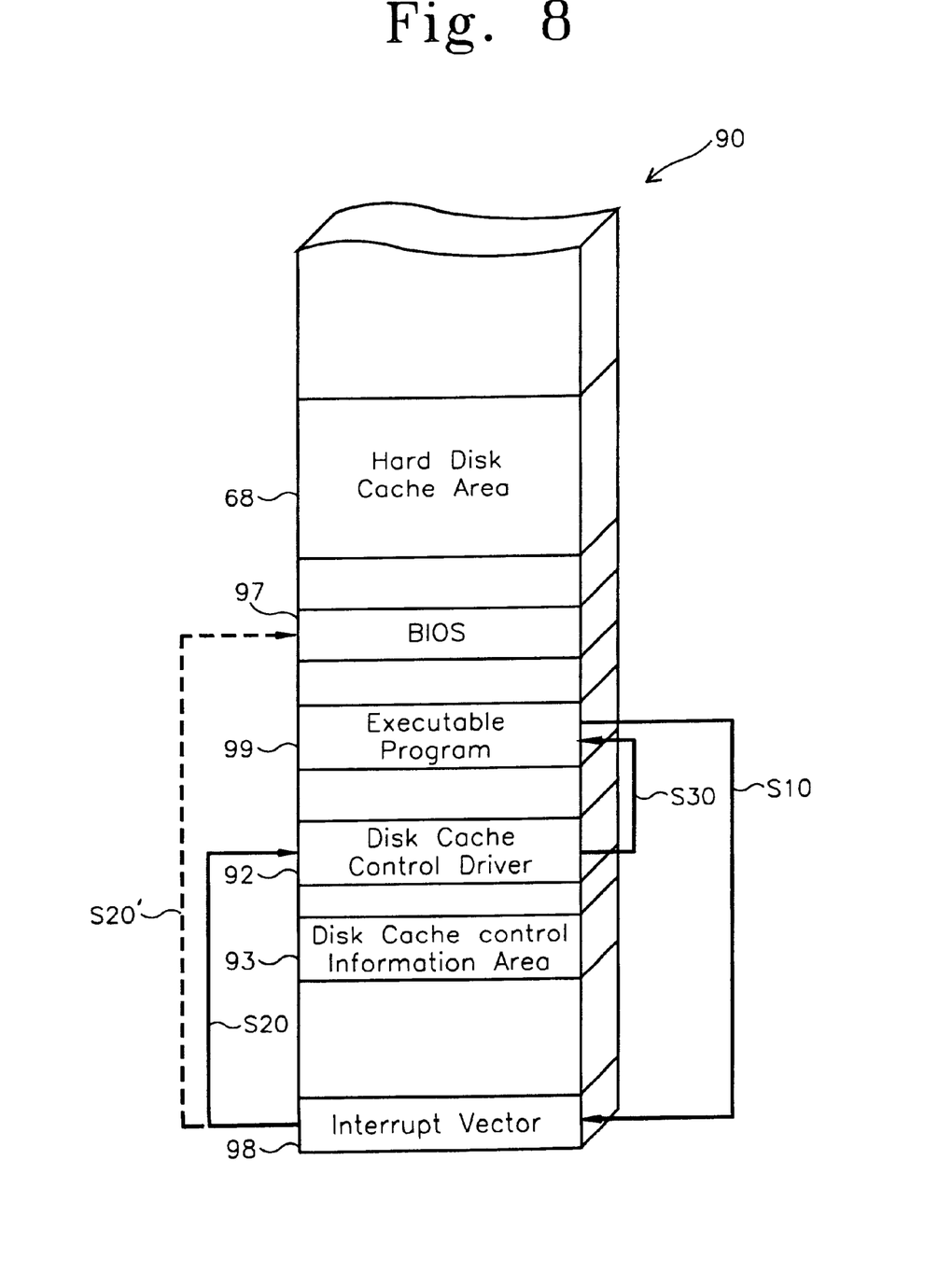
FIG. 8 is a diagrammatic view of the memory map for explaining the controlling operation for the hard disk cache.

The above mentioned controlling operation for the hard disk cache will be explained again with reference to the memory map depicted in FIG. 8. When read/write request for the hard disk occurs during the time that a program 99 is being executed, an interrupt (the BIOS interrupt 13h) is invoked. At that moment, the executed program is interrupted and an execution code located in the interrupt vector table 98 is executed by a command from the CPU 62, as shown by an arrow S10. That is, when the interrupt is invoked, it jumped to the address of the execution code.

In order to deal with the interrupt, generally it jumped to the corresponding process routine in the BIOS area 97, as shown by an arrow S20'. However, since the above interrupt vector table 98 has been initialized by the processing step 200 of FIG. 7, it jumps to the disk cache control driver 92 for processing interrupt reception step 210 of FIG. 7 as shown by an arrow S20. Thereafter, a controlling process for the disk cache 68 is performed and control is returned to the program 99 as shown by an arrow S30.

The controlling method for the disk cache 68 will be described in detail with reference to FIG. 9 to 11. In other words, FIG. 9 is a detailed flowchart of the reading operation shown in FIG. 7, and FIG. 10 and 11 are detailed flowcharts of the writing operation and flushing operation, respectively.

Figure 9:
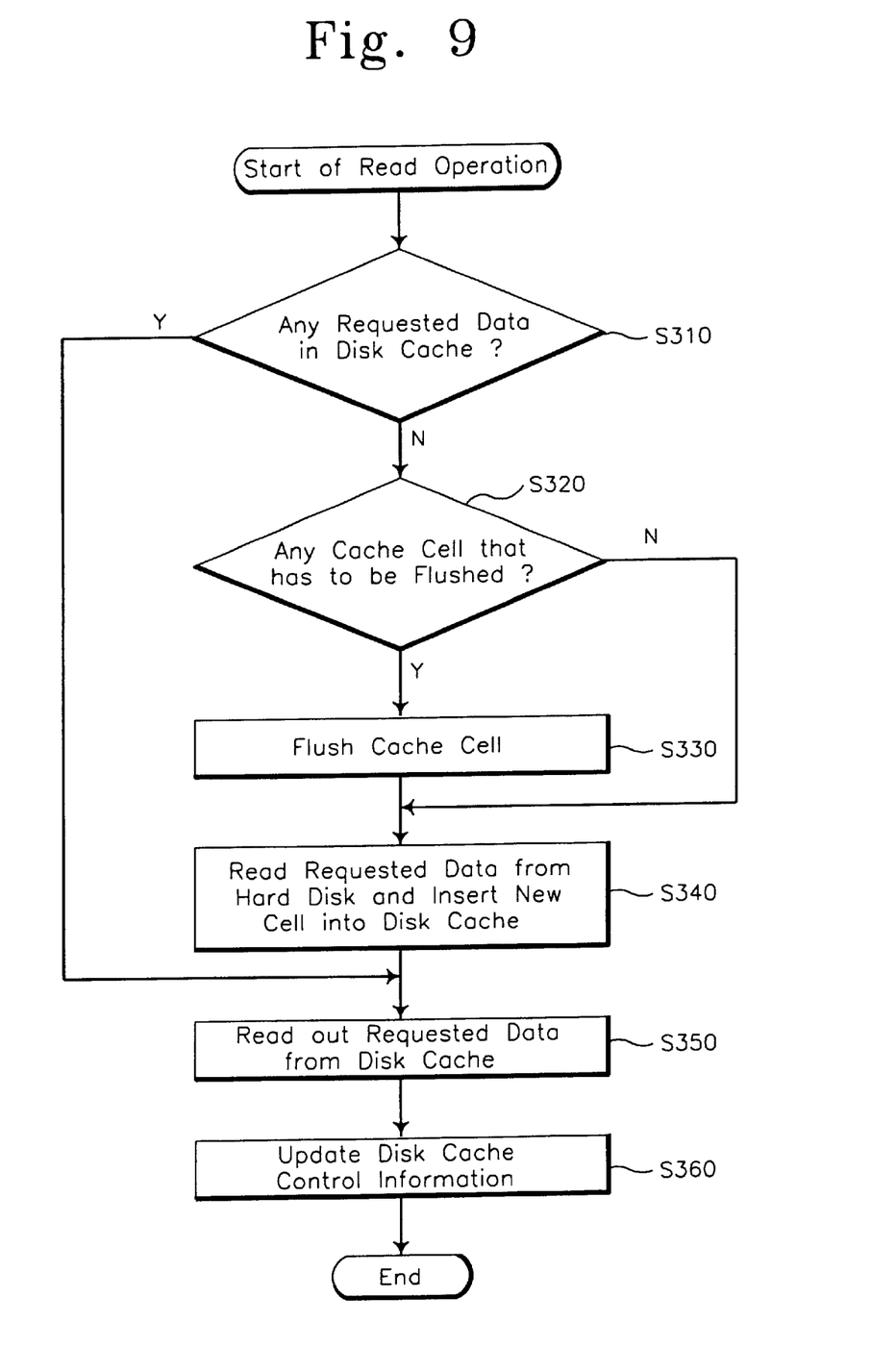
FIG. 9 is a flowchart showing the reading operation shown in FIG. 7.

As shown in FIG. 9, the step of controlling read operation includes decision steps 310 and 320 when staring read operation. At step 310, the decision is made whether any data requested to read exists in the disk cache 68. If the requested data does not exist in the cache 68, it proceeds to step 320 to determine whether any cache cell that has to be flushed in the cache 68 exists. A determination can be made according to the corresponding flag bit among the control flag 96 shown in FIG. 6. If the cache cell exists, the data of all cache cells written in the cache 68 are written into the hard disk drive 66 at step 330, then the disk cache 68 is flushed. On the other hand, if the cache cell does not exist or the disk cache has been flushed, it proceeds to step 340 to read the requested data from the hard disk drive 66 and the read data is inserted into the disk cache 68.

Also, if the requested data exists in the disk cache 68 at step 310 or reading from the hard disk and inserting into disk cache operation is completed at step 340, a read out operation from the disk cache 68 is performed at step 350. Thereafter, it proceeds to step 360 to update disk cache control information in the area 93 of the main memory, which has control information for the respective cache cells of the disk cache 68. Then the reading operation ends.

Figure 10:
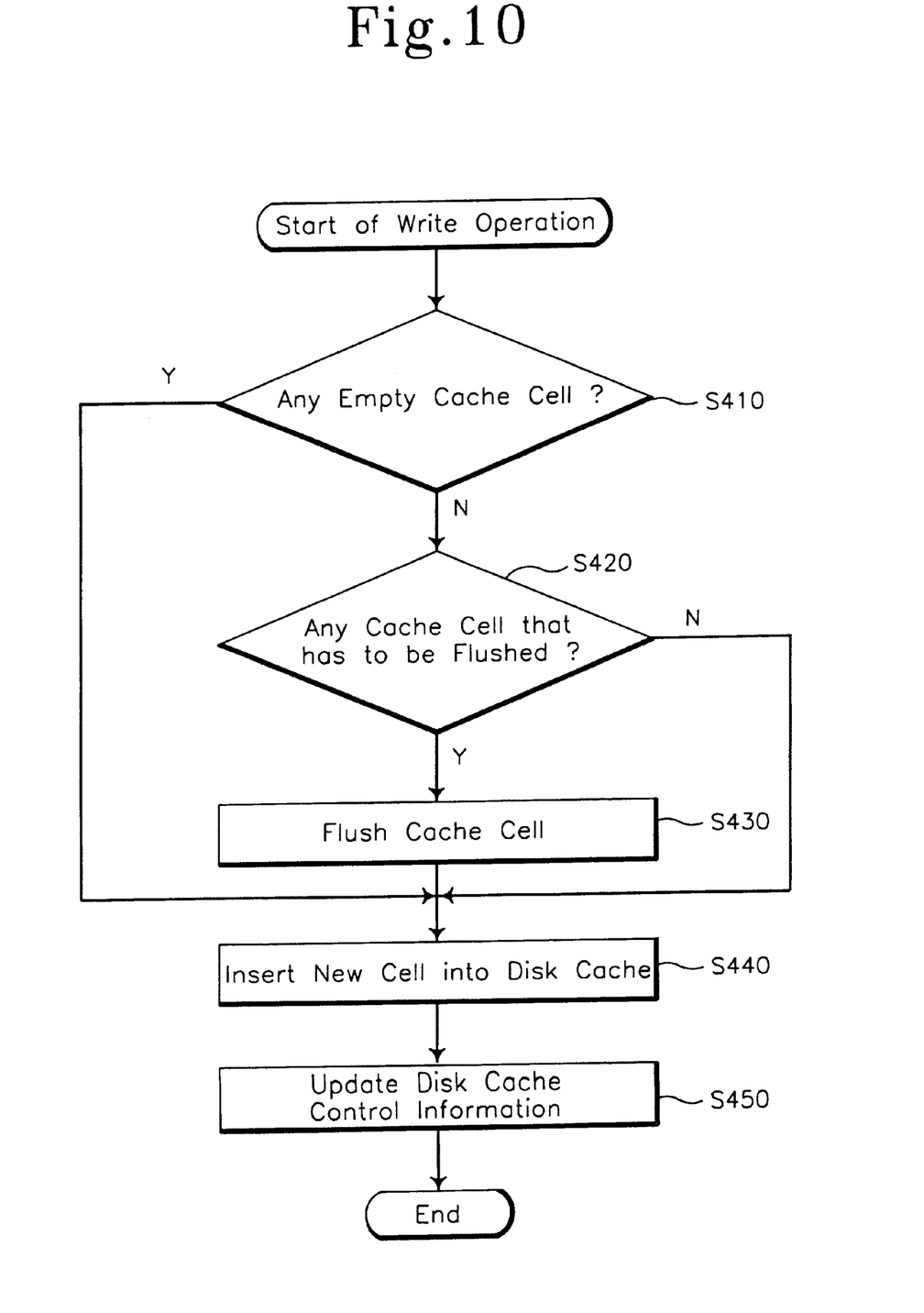
FIG. 10 is a flowchart showing the writing operation shown in FIG. 7.
Figure 11:
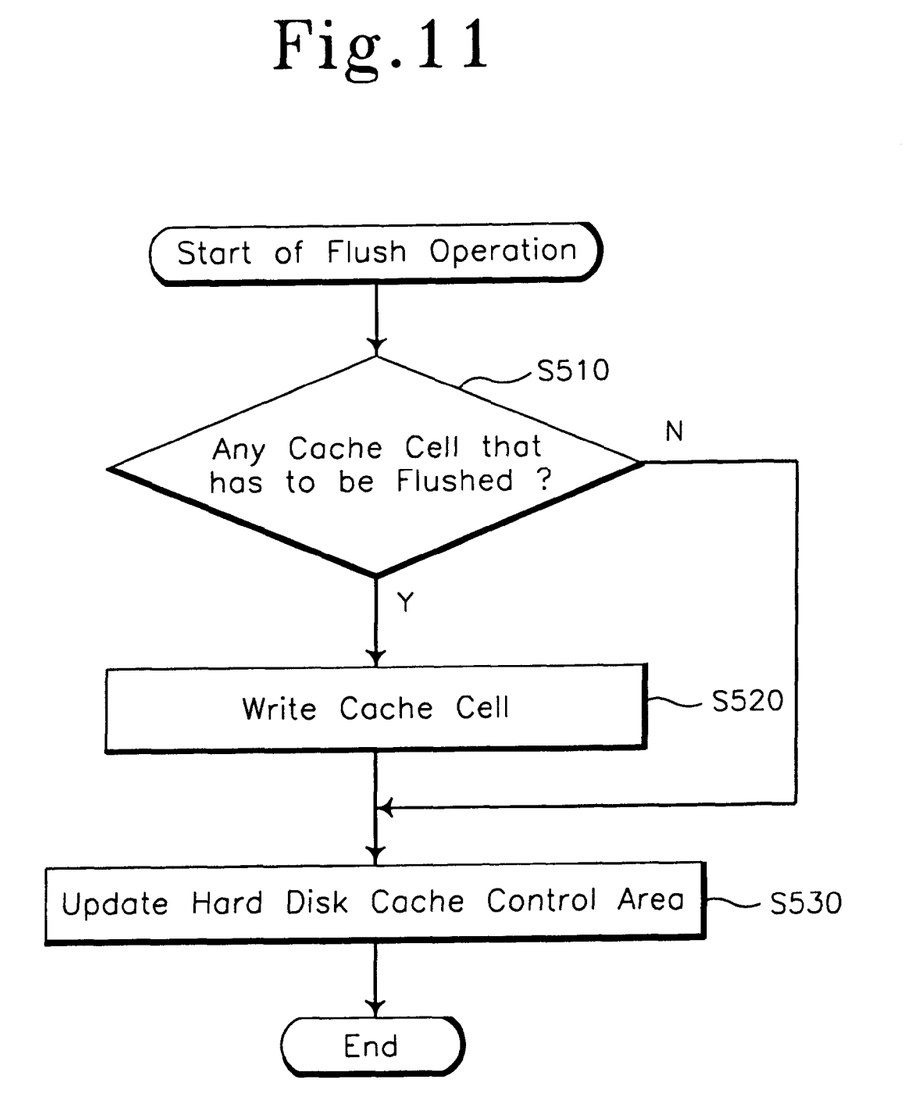
FIG. 11 is a flowchart illustrating the flushing operation shown in FIG. 7.

Referring to FIG. 10, the controlling process for the write operation is illustrated. When a writing operation started, a decision is made at step 410 as to whether or not inserting new cell into the disk cache is available, that is, whether or not there are any empty cache cells. If it is not available, it proceeds to step 420 to determine whether or not any cache cell that has to be flushed in the disk cache 68 exists. If such a cache cell exists, the data of all cache cells written in the cache 68 are written into the hard disk drive 66 at step 430, and then the disk cache 68 is flushed. On the other hand, if insertion of a new cell in the cache is available at step 410 or if it is found that the written cache cell requiring flushing does not exist at step 420, and the disk cache 68 has been flushed in the previous step, it proceeds to step 440 to delete the oldest cache cell and insert a new cache cell into the disk cache 68. Thereafter, it proceeds to step 450 to update disk cache control information in the area 93 of the main memory. Then the writing operation is ended.

Finally, the controlling process for the flushing operation is illustrated in FIG. 11. Starting the flush operation, a decision is made at step 510 as to whether or not any cache cell that has to be flushed in the disk cache 68 exists. If the cache cell exists, it proceeds to step 520 to write the data of all cache cells written in the cache 68 into the hard disk drive 66. Then the disk cache is flushed.

On the other hand, if it is found that a written cache cell requiring flushing does not exist at step 510, or the writing into the hard disk operation has been completed at step 520, it proceeds to step 530 to update disk cache control information in the memory area 93. Then the flushing operation ends.

As apparent from the above description, since the method according to this invention controls the hard disk cache by using write back mode technique, it can considerably reduce the number of times that the hard disk is accessed, thereby saving battery power consumption by the hard disk drive as much as possible, and extending available usage time of the battery. Also, as proper restriction is made to access the hard disk drive, reducing the hard disk read/write operation is possible, thereby enhancing the system performance. Further, since remedy is made to the sudden system power failure, losing of data in the disk cache is effectively prevented.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method of controlling a hard disk cache in a computer, the method comprising the steps of:

initializing a disk cache control program loaded during a software booting by an operating system;

receiving an interrupt occurring during the course of execution of a program and determining the kind of the received interrupt, the kinds of interrupt including a read or write request respectively occurring during a read or write request for the hard disk drive, an SMI (system management interrupt) interrupt occurring during a system power failure or during rebooting, and an interrupt occurring at the termination of a program;

determining whether requested data exists in the disk cache if the invoked interrupt is the read request interrupt;

writing data contained within all cache cells stored in the disk cache into the hard disk drive and reading out the requested data from the hard disk drive, in the absence of the requested data existing in the disk cache;

determining whether insertion of a new cell in the disk cache is available, if the invoked interrupt is the write request interrupt;

writing data contained within all cache cells stored in the disk cache into the hard disk drive and inserting a new cell of the write request data into the disk cache in the absence of a new cache cell being available; and flushing the disk cache if a cache cell written in the disk cache exists and writing data contained within it into the hard disk drive, if the invoked interrupt is the SMI interrupt or the program ending interrupt.

2. The method according to claim 1, the step of initializing including the steps of:

handling interrupt for controlling hard disk cache in response to one of the invoked interrupts; and initializing a control information area of the disk cache in the main memory, which has control information for the respective cache cell.

3. The method according to claim 1, the step of controlling disk cache responsive to the read request interrupt including the steps of:

determining whether data requested to read exists in the disk cache;

determining whether a cache cell written in the cache exists, in the absence of the requested data existing in the cache;

writing data contained within all cache cells written in the disk cache into the hard disk drive if the written cache cell exists;

reading out the requested data from the hard disk drive and inserting the read data into the disk cache, in the absence of the written cache cell existing or when the disk cache has been flushed;

reading out the requested data from the disk cache if the requested data exists in the disk cache or when the reading and inserting operation has been completed; and updating a disk cache information area of a main memory, which has control information for the respective cache cells of the disk cache.

4. The method according to claim 1, the step of controlling disk cache responsive to the write request interrupt including the steps of:

determining whether inserting a new cell into the disk cache is available;

determining whether a cache cell written in the disk cache exists in the absence of a new cache cell being available;

writing data contained within all cache cells written in the cache into the hard disk drive and then flushing cache if the written cache cell exists;

inserting the requested write data as new cache cell into the disk cache if insertion of a new cell is available or in the absence of the written cache cell existing, and the disk cache has been flushed; and updating a disk cache control information area of a main memory.

5. The method according to claim 1, the step of flushing the disk cache including the steps of:

determining whether a cache cell written in the disk cache exists;

writing data contained within all cache cells written in the cache into the hard disk drive and then flushing the disk cache if the written cache cell exists; and updating a disk cache control information area of a main memory in the absence of the written cache cell existing or when the writing into the hard disk operation has been finished.

\* \* \* \* \*